INVENTOR
PETER LAUCK III

BY Semmes and Semmes

ATTORNEYS

United States Patent Office 3,437,792
Patented Apr. 8, 1969

3,437,792
ELECTRICAL HEATING DEVICE WITH TEMPERATURE CONTROL MEANS
Peter Lauck III, Princeton, N.J., assignor, by direct and mesne assignments, to J. P. Stevens & Co., New York, N.Y., a corporation of Delaware
Filed Oct. 31, 1967, Ser. No. 679,467
Int. Cl. H05b 1/02
U.S. Cl. 219—505    13 Claims

ABSTRACT OF THE DISCLOSURE

An electrical heating device which comprises an integrated structure having three connected layers or plies of material for use as an electric blanket and the like. The first layer comprises a decorative layer that may be used as a cover. The second layer is normally positioned adjacent to the selected area to be heated. A third layer is interposed between the first and second layers and contains a heating element that is substantially coextensive with the area to be heated. The second layer is of sufficient size so that, when the heating device is used as an electric blanket, it may be tucked into the bed. The first layer is of sufficient size so that it may then be used as a decorative bed cover. An electrical control circuit including an electronic switch that comprises a thyristor is used to control activation of the heating element, and comprises a temperature control means mounted in the second layer that functions to maintain the selected area at a temperature determined by temperature selection means mounted in the first layer.

CROSS REFERENCE TO RELATED APPLICATIONS

This invention comprises an improvement over United States Patent 3,385,958 of Peter Lauck III entitled, Electric Blanket, dated May 28, 1968, and an application for United Stated patent of Peter Lauck III identified as Ser. No. 454,417, filed May 10, 1965, entitled, Electric Blanket.

BACKGROUND OF THE INVENTION

*Field of the invention*

The invention relates to heating devices that are controlled by a solid state electronic control circuit. It has particular use in an electric blanket or sheet, and an associated electric blanket structure is also disclosed.

*Description of the prior art*

The prior art discloses the utilization of heating devices in which activation of the heating element is electronically controlled by a temperature responsive element comprising a bi-metallic switch or thermostat. The temperature responsive element is normally mounted in a central control box that is physically separated from the heating element and the area selected to be heated. Therefore, accurate control of the temperature in the area selected to be heated is difficult to achieve. Further such temperature responsive elements are normally slow-acting and in large in size, and consume a relatively large amount of power.

Also the prior art teaches that the heating element, when used in an electric blanket, should be interposed between cover layers of blanket-like material, and therefore necessitates the use of a separate bed cover. Further, the control box that houses the electrical components associated with prior art electric blankets usually comprises a relatively large structure that must be positioned on a stand such as a night table adjacent to the bed. Therefore, manipulation of the controls associated therewith by the user is made difficult.

Applicant's application identified above disclose a silicon controlled rectifier (hereinafter referred to as an SCR) that may be connected in the control circuit associated with the heating device, which is conductive in one direction, and is fired by transistor trigger circuits, to selectively activate the heating element. Therefore, the heating element can be actuated for a maximum period of time equal to one-half the period of an applied alternating current input.

SUMMARY OF THE INVENTION

These and other defects and objections of prior art heating devices are solved by the present invention which relates to a heating device that comprises an integrated heating device structure comprising a thyristor control circuit. More particularly, the invention discloses a heating device comprising an integrated structure having three distinct layers. The first layer comprises a decorative cover, the second layer may comprise a napped textured material, and the third layer interposed between the first and second layers comprises a heating element and an associated reflector element to reflect and direct heat through the second layer to the area selected to be heated.

The heating device may be used as an electric blanket or sheet or similar cover, but its utility is not limited thereto. For example, it can be adapted for use as a floor covering, curtain, electric clothing, and other such devices.

A temperature control means is mounted in the second layer, which is normally positioned adjacent to the area selected to be heated. It therefore provides accurate control and maintenance of the predetermined temperature to which it is desired to heat the selected area, as determined by a variable temperature selection means mounted in the first layer or blanket binding, within easy reach of the user. When used as an electric blanket, this combination maximizes maintenance of the predetermined temperature in the sleeping area associated with the electric blanket, and provides quick and easy manipulation of the temperature selection means.

Further, the utilization of the thyristor in the electronic control circuit, provides heating element use of both positive and negative halves of a conventional alternating current power supply, thereby maximizing the efficiency of the heating device, and minimizing space requirements for the electronic components module.

DETAILED DESCRIPTION OF THE INVENTION

Figure 1:
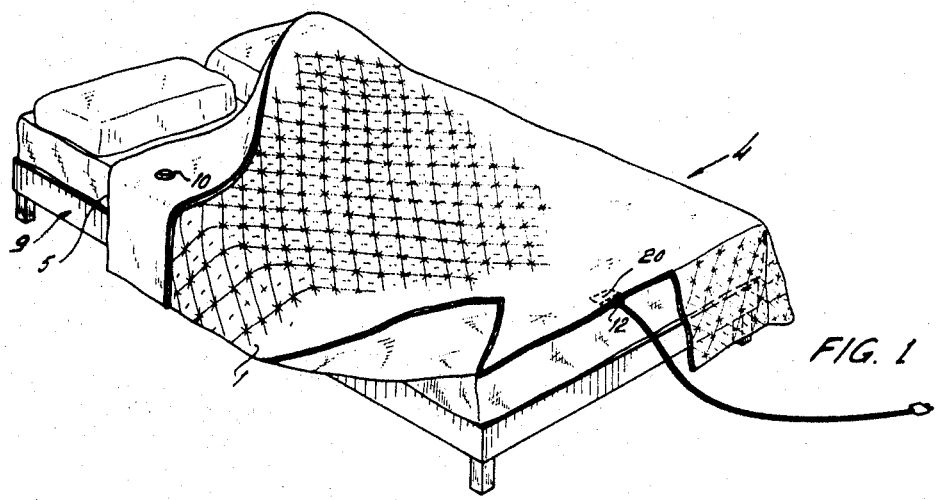
FIGURE 1 is an isometric view of a preferred embodiment of the heating device integrated structure that comprises an electric blanket, illustrating the placement thereof on a bed.
Figure 2:
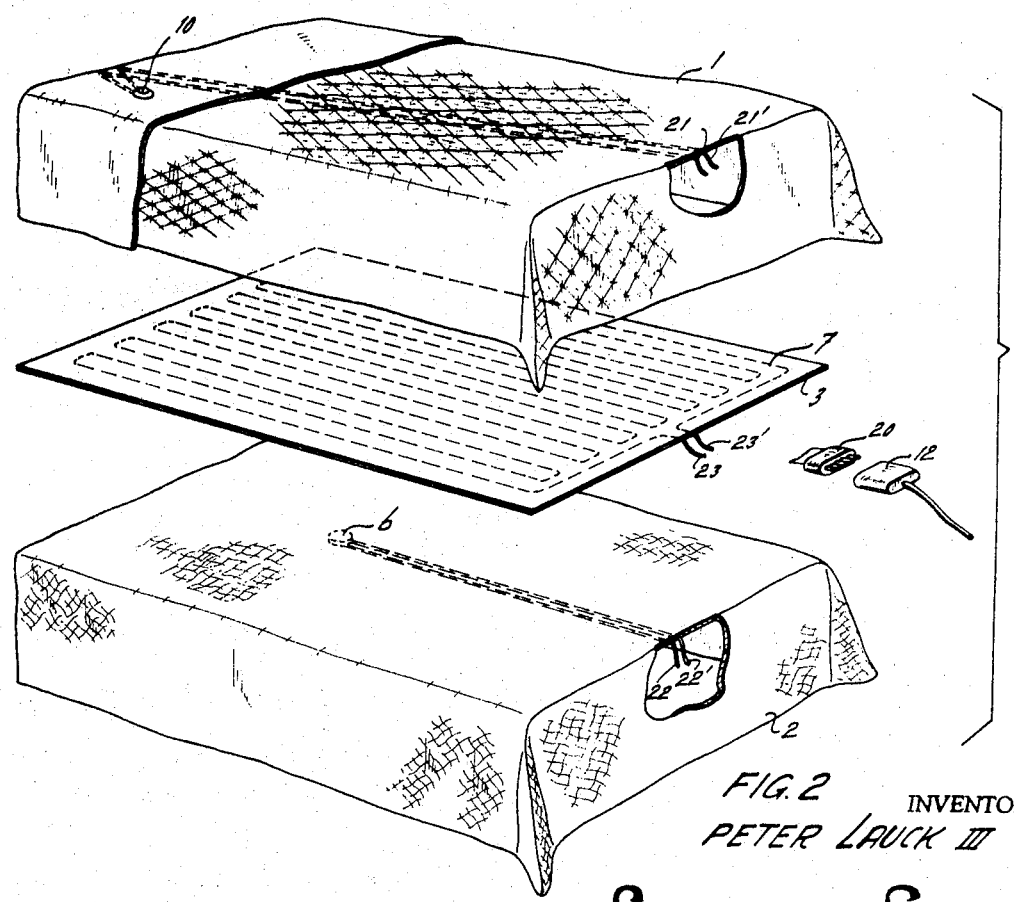
FIGURE 2 is an isometric view of the various layers of the electric blanket illustrated in FIGURE 1 in detached form, showing the various relative sizes of the three layers.
Figure 3:
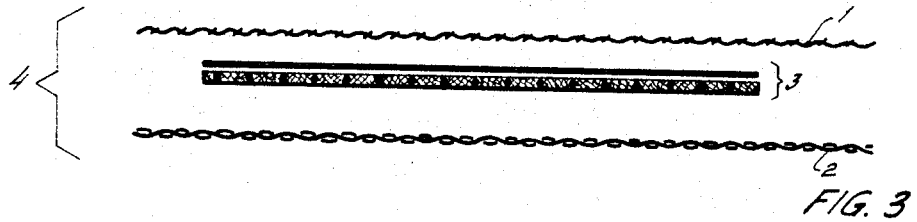
FIGURE 3 is a sectional view of the electric blanket taken along the section lines 3—3 of FIGURE 2.
Figure 5:
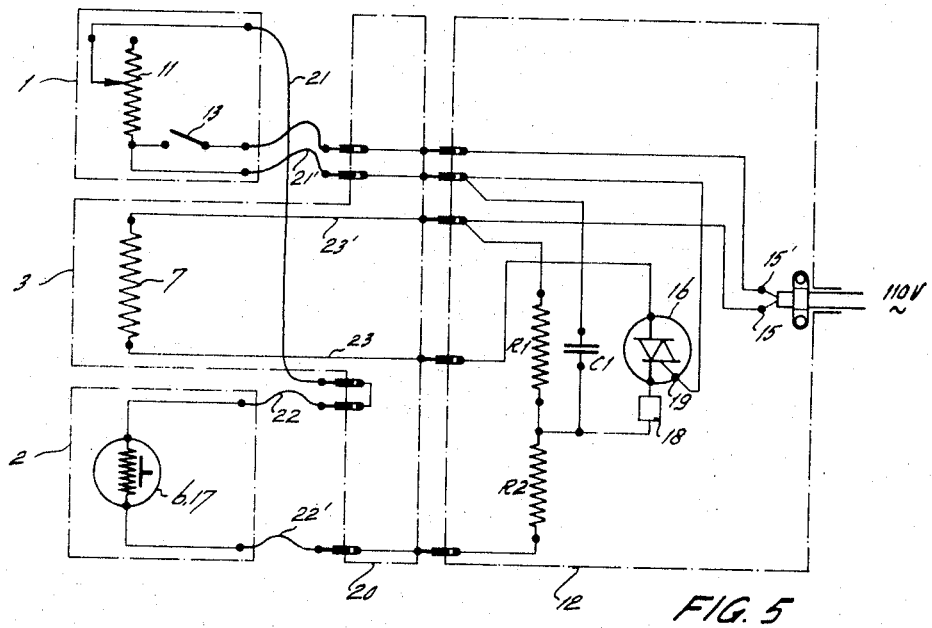
FIGURE 5 illustrates the entire circuitry including source.

FIGURES 1 through 3 illustrate a preferred embodiment of the invention wherein the heating device is an electric blanket that comprises an integrated structure 4 having three layers. Layer 1 comprises a decorative cover and may, for example, comprise a conventional type of bedspread material. Layer 2 comprises a conventional type of blanket material that separates layer 3 from the selected area 5 to be heated. Obviously, layer 2 may be either a sheet, non-woven or of conventional weave, blanket material or fabric. For illustrative purposes, the heating device has been shown as an electric blanket although it may be used for other heating purposes. For example, it may be used as a floor covering, in which case layer 1 would be positioned adjoining the floor. Other uses such as heated clothing and heated fabrics in general are also contemplated by the invention.

Temperature control means 6, 17 is mounted in layer 2 and comprises a heating element 7 that may consist of a heating coil that is electrically insulated from layers 1 and 2. Alternatively, layer 3 may comprise a fabric, in which the heating coil is interwoven to comprise an integral part of the fabric. In this case, the heating coil wire may be bulked or have a fiber-like appearance. Still another alternative construction is for layer 3 to comprise a flexible printed circuit that is electrically insulated from layers 1 and 2.

In any case, reflector element 8 is positioned between layer 1 and heating element 7 (FIGURE 3) to reflect heat emitted by the heating element and direct it through layer 2 to the area selected to be heated. The reflector element may, for example, comprise an aluminum coated sheet or othr suitable reflector material.

Layer 2 may comprise a conventional blanket material or fabric, and preferably comprises a thermal open-weave material to maximize heat radiation therethrough to the sleeping area. The three layers may be joined by various conventional means. For example, they may be sewn together, or thermoplastically bonded by conventional heat setting means. Alternatively, zippers, snaps, or "Velcro" binders may be employed.

As illustrated in FIGURE 1, decorative layer 1 is substantially greater in area than layer 3, and is of sufficient size such that it hangs over the bed, and functions as a bed cover. When used as an electric blanket, layer 3 is dimensioned to be substantially coextensive to the sleeping area that comprises the top surface of mattress 5 associated with bed 9. It is apparent that the electric blanket may comprise various sizes so as to be useable with conventional beds such as "King" size, "Twin" size, etc. Layer 2 is made sufficiently large so as to enable it to be tucked into the mattress.

Variable temperature selection device 10 is mounted in first layer 1 or the binding of the blanket (FIGURE 1) and comprises potentiometer 11 that may be varied to selectively control activation of heating element 7 to maintain the temperature of the sleeping area at the predetermined temperature selected. Because layer 1 comprises a bed cover, variable temperature selection device 10 is mounted on the inside portion thereof, and is therefore not visible when the electric blanket is not in use. However, when layer 1 is "turned down" the temperature selection device 10 is on the outside portion of the electric blanket, within easy access by the user. The on-off switch 13 may also be mounted in layer 1, in temperature selection device 10 (FIGURE 2), and potentiometer 11 may function as the on-off switch in an extreme position thereof as conventionally known.

Electronic components module 12 houses the electronic circuitry comprising diac 18, thyristor 16, capacitor C1, and resistors R1 and R2. The electronic control circuitry illustrated in FIGURE 4 comprises a conventional 110 volt alternating current supply connected to input terminals 15 and 15'. It further comprises the series connection of on-off switch 13 and first and second parallel branches, the first parallel branch consisting of the series connection of heating element 7 and thyristor 16, and the second parallel branch consisting of the trigger circuit for thyristor 16.

Resistor R1 is connected in series with the trigger circuit comprising parallel connection of capacitor C1 and the series connection of potentiometer 11, thermistor 17, and resistor R2. The setting of potentiometer 11 and the resistance of thermistor 17 determine the firing characteristics of the thyristor.

Rectifier means 18 are connected between the series connection of resistor R1 and capacitor C1, and gate 19 of thyristor 16, and may comprise first and second oppositely poled Zener diodes connected in parallel, or alternatively, a diac. Further, thyristor 16 comprises a triac. Such elements may be commercially obtained in a single package. For example, note RCA triac type 40431 which comprises a diac connected to the gate of a triac, both being encapsulated in one package. Thermistor 17 has a negative coefficient, and in combination with potentiometer 11, determines the firing characteristics of the triac.

The combination of the rectifier means and the triac provides full wave phase control for the heating circuit. It is known that the gate current must be equal to the gate threshold energy to initiate triac conduction. Assume that a positive gate current at least equal to the gate current threshold must be applied to triac 16 to initiate conduction thereof in one direction during the positive half cycle of the applied input, and a negative gate current at least equal to the gate current threshold must be applied to triac 16 during a negative half cycle of the applied input voltage to initiate triac conduction in the opposite direction. The gate current may therefore lead the voltage across triac 16 by maximum of 90°, depending upon the relative values of capacitor C1, and the resistances of resistors R1, R2, thermistor 17, and potentiometer 11. Therefore, by varying the relative magnitudes of the resistive and capacitive components, the angle by which the gate current leads the voltage may be varied.

The relative phase of the gate current and the voltage across the triac, as well as the relative amplitude of the gate current at different times, determines the duty cycle of triac 16 (that portion of the corresponding positive and negative half cycles during which it is conducted). When triac 16 is conducting, heating element 7 is switched into operation, and the total heat that it develops will be determined by the duty cycle of triac 16. To minimize the duty cycle of triac 16, the resistances of thermistor 17 and potentiometer 11 should be minimized. Therefore, a thermistor having a negative coefficient is utilized, such that when the temperature in the sleeping area increases beyond the temperature selected by potentiometer 11, the impedance of the trigger circuit correspondingly decreases.

The total current flowing through resistor R1 and the trigger circuit correspondingly increase, and capacitor C1 is therefore charged at a slower rate. Thus, the gate energy applied through rectifier means 18 to the gate of triac 16 will exceed the gate threshold energy at a later time (if ever) in the positive or negative portion of the cycle and the duty cycle will correspondingly decrease.

To maximize the duty cycle of triac 16 the resistances of potentiometer 11 and resistor R2 should be maximized. Thus, the impedance of the trigger circuit is increased, and the total current flowing through capacitor C1 and the trigger circuit is correspondingly increased. Capacitor C1 thus charges at a faster rate and the triac is driven to conduction at a corresponding earlier time in the positive or negative portion of the applied alternating current input signal. Therefore the duty cycle of triac 16 is increased.

When the impedance of the trigger circuit is maximized, by maximizing the resistances of thermistor 17 and potentiometer 11, the voltage drop thereacross will increase because the resistance of series connected resistor R1 remains constant. Therefore, the potential to which capacitor C1 charges correspondingly increases. Similarly, when the impedance of the trigger circuit is minimized by minimizing the resistances of thermistor 17 and potentiometer 11, the voltage across the trigger circuit is decreased. Thus the relative resistance values of resistors R1, R2, thermistor 17, and potentiometer 11, and the capacitance of capacitor C1, are selected such that increasing the resistance of potentiometer 11 or thermistor 17 causes a corresponding increase in the duty cycle of triac 16.

Figure 4:
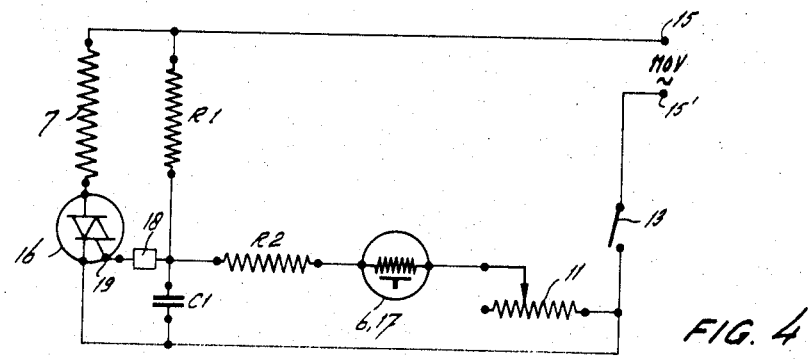
FIGURE 4 is an electrical schematic diagram of a preferred control circuit that may be utilized in conjunction with the heating device.

The electronic control device illustrated in FIG. 4 functions in the following manner. When the alternating current signal is applied between inputs 15 and 15', the control circuit is enabled. Temperature selection unit 10 and more particularly, potentiometer 11 is adjusted to select the desired temperature of the sleeping area. If the actual sleeping area temperature is lower than the selected temperature, thermistor 17 will have a resistance such that triac 16 is driven to conduction at a corresponding time during the positive and negative portions of the input signal. Therefore, the circuit of heating coil 7 will be completed during the duty cycle of triac 16, and it will heat the sleeping area to the desired temperature. When the selected temperature is reached, the thermistor resistance will be such that triac 16 will be biased to non-conduction. Then as the sleeping area temperature decreases, the resistance of thermistor 17 will increase. This will cause triac 16 to be driven to conduction during the positive and negative portions of the input signal to again cause heating element 7 to conduct. The duty cycle of triac 16 will vary, depending upon the variance of the sleeping area temperature from the selected temperature as determined by the setting of potentiometer 11. That is, the greater the variance, the longer the duty cycle.

If the temperature of thermistor 17 again increases in response to the rise in temperature in the selected area thereby decreasing its resistance, the duty cycle of triac 16 will decrease and will fall to zero when the actual sleeping area temperature reaches the selected temperature. The cycle described above thus repeats itself, and the sleeping area temperature is maintained at a substantially constant temperature equal to the selected temperature.

Thus the thermistor will maintain the sleeping area temperature relatively constant at the selected temperature, especially since the triac responds rapidly to variations in its gate input. Further, it is particularly advantageous for the use disclosed because of its low power consumption and in combination with the rectifier means, provides voltage regulation characteristics.

Of course, an on-off switch, overload protection device, and an indicator light (not shown) may be provided for use in conjunction with the described control circuit. These are not shown because they are conventional in the art. However, an indicator light may be mounted in temperature selection unit 10, and potentiometer 11 may comprise a commercially available product such that it functions as the on-off switch and the indicator light in an extreme position thereof, as well as the temperature selection means.

Further, the temperature selection unit 10, resistor R1, resistor R2, capacitor C1, rectifier means 18, and its integrated triac 16 may be encapsulated in electronic components module 12. If this is done electronic components module preferably comprises a printed circuit to minimize space requirements. Connection lines 21–21', 22–22', and 23–23' are respectively provided in layers 1, 2, and 3 to connect the circuit elements contained therein to electronic components module 12 through plug 20 which mates with complementary plug 12. Preferably, plug 20 is attached to the electric blanket, between the first and second layers thereof, so that it is not visible when the electric blanket is in use, and for easy connection of electronic components module 12 when the electric blanket is in use (see FIGS. 1 and 2). Plug 20 may be attached to the electric blanket by conventional means; for example, it may be sewn thereto.

The three layers of the blanket may be detached from each other for cleaning purposes. In this regard, the various components such as temperature selection unit 10 and thermistor 6 may be connected to their respective layers of the electric blanket through jacks, so that they may be removed during cleaning of layers 1 and 3, respectively.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

I claim:
1. An integrated structure to heat a selected area which comprises:
   (A) first and second outer layers of electrically non-conductive fabric, said second layer being normally positionable adjacent the selected area;
   (B) an electrical heating element having a dielectric exterior, interposed between the respective outer layers of fabric;
   (C) energization means selectively connectable to said electrical heating element;
   (D) a reflector disposed in said integrated structure, substantially coextensive with said heating element to reflect heat therefrom towards said selected area;
   (E) heating element temperature control means, including a triac with first and second main terminals and a gate, the main terminals being connected in series with said heating element, the temperature control means further comprising temperature responsive means mounted in said second layer of fabric, connected between the energization means and the gate, to control triac conduction, to thereby maintain said selected area at a predetermined temperature.

2. The integrated structure as recited in claim 1, wherein said reflector is disposed between said first outer layer of fabric and said heating element to insulate and reflect heat therefrom and direct it through the second outer layer of fabric to the selected area.

3. The integrated structure of claim 1, further comprising a third layer of fabric interposed between said first and said second outer layers, the heating element being disposed within said third layer.

4. The integrated structure as recited in claim 1, wherein said heating element comprises an electrically insulated flexible printed circuit.

5. The integrated structure as recited in claim 1 wherein said temperature control means comprises at least one thermistor.

6. The integrated structure as recited in claim 1, wherein said temperature control means further comprises variable temperature means mounted in said first outer layer of fabric to selectively vary said predetermined temperature.

7. The integrated structure as recited in claim 3, wherein the integrated structure comprises an electric cover for use on a bed, the selected area comprising the sleeping area associated therewith,
   said third layer being substantially coextensive with said sleeping area,
   said second outer layer being larger than said third layer and of sufficient size to be tucked into the bed,
   said first outer layer being larger than said third layer and comprising a decorative cover of sufficient size to cover the third layer and the second layer when the second layer is tucked into the bed.

8. The integrated structure of claim 1, wherein said energization means comprise a source of power having first and second terminals, said triac having main terminals and a gate, the series connection of said heating element and said triac main terminals connected between said first and second terminals,
   a trigger circuit connected between one of said first and second terminals and said gate comprising the parallel connection of said temperature responsive element and a capacitor.

9. The integrated structure of claim 8 further comprising full wave rectifier means interposed between the trigger circuit and the gate.

10. The integrated structure of claim 9, wherein the trigger circuit further comprises the series connection of variable resistance means and said temperature responsive element connected in parallel with said capacitor.

11. The integrated structure of claim 10 wherein said variable resistance means comprises a potentiometer.

12. The integrated structure of claim 11 further comprising a resistance means connected between the trigger circuit and the other of said first and second terminals.

13. The integrated structure recited in claim 12 wherein the temperature responsive element comprises at least one thermistor.

References Cited

UNITED STATES PATENTS

| | | | |
|---|---|---|---|
| 2,850,617 | 9/1958 | Coldren | 219—529 |
| 2,948,802 | 8/1960 | Shaw | 219—212 |
| 3,072,776 | 1/1963 | Quenneville | 219—212 |
| 3,270,184 | 8/1966 | Negromantz | 219—501 |
| 3,385,958 | 5/1968 | Lauck III | 219—501 |

VOLODYMYR Y. MAYEWSKY, *Primary Examiner.*

U.S. Cl. X.R.

219—212, 529, 494, 544, 549